(12) United States Patent
Grabois et al.

(10) Patent No.: US 11,283,825 B2
(45) Date of Patent: Mar. 22, 2022

(54) LEVERAGING ATTACK GRAPHS OF AGILE SECURITY PLATFORM (71) Applicant: Accenture Global Solutions Limited, Dublin (IE)

(72) Inventors: Dani Grabois, Tel Aviv-Jaffa (IL); Eitan Hadar, Nesher (IL); Asher Genachowski, Shoham (IL)

(73) Assignee: Accenture Global Solutions Limited, Dublin (IE)

( * ) Notice: Subject to any disclaimer, the term of this patent is extended or adjusted under 35 U.S.C. 154(b) by 402 days.

(21) Appl. No.: 16/375,965

(22) Filed: Apr. 5, 2019

(65) Prior Publication Data
US 2020/0177615 A1 Jun. 4, 2020

Related U.S. Application Data (60) Provisional application No. 62/774,516, filed on Dec. 3, 2018.

(51) Int. Cl.
*G08B 23/00* (2006.01)
*G06F 12/16* (2006.01)
(Continued)

(52) U.S. Cl.
CPC ........ *H04L 63/1433* (2013.01); *G06F 21/577* (2013.01); *G06F 2221/034* (2013.01)

(58) Field of Classification Search
CPC ............... H04L 63/1433; G06F 21/577; G06F 2221/034
(Continued)

(56) References Cited

U.S. PATENT DOCUMENTS 5,521,910 A  5/1996 Matthews
6,279,113 B1  8/2001 Vaidya
(Continued)

FOREIGN PATENT DOCUMENTS

EP  1559008  8/2005
EP  1768043  3/2007
(Continued)

OTHER PUBLICATIONS

Narmeen Zakaria Bawany; DDoS Attack Detection and Mitigation Using SDN: Methods, ractices, and Solutions; SPRINGER-2017; p. 425-441.*
(Continued)

*Primary Examiner* — Monjur Rahim
(74) *Attorney, Agent, or Firm* — Fish & Richardson P.C.

(57) ABSTRACT

Implementations of the present disclosure include receiving, from an agile security platform, attack graph (AG) data representative of one or more AGs, each AG representing one or more lateral paths within an enterprise network for reaching a target asset from one or more assets within the enterprise network, processing, by a security platform, data from one or more data sources to selectively generate at least one event, the at least one event representing a potential security risk within the enterprise network, and selectively generating, within the security platform, an alert representing the at least one event, the alert being associated with a priority within a set of alerts, the priority being is based on the AG data.

24 Claims, 5 Drawing Sheets

(51) Int. Cl.
  *G06F 12/14* (2006.01)
  *G06F 11/00* (2006.01)
  *H04L 29/06* (2006.01)
  *G06F 21/57* (2013.01)
(58) Field of Classification Search
  USPC .......................................................... 725/25
  See application file for complete search history.

(56) References Cited

U.S. PATENT DOCUMENTS

| | | | |
|---|---|---|---|
| 6,487,666 | B1 | 11/2002 | Shanklin et al. |
| 7,540,025 | B2 | 5/2009 | Tzadikario |
| 7,703,138 | B2 | 4/2010 | Desai et al. |
| 8,099,760 | B2 | 1/2012 | Cohen et al. |
| 8,176,561 | B1 | 5/2012 | Hurst et al. |
| 8,656,493 | B2 | 2/2014 | Capalik |
| 9,256,739 | B1 | 2/2016 | Roundy et al. |
| 9,563,771 | B2 | 2/2017 | Lang et al. |
| 9,633,306 | B2 | 4/2017 | Liu et al. |
| 10,084,804 | B2 | 9/2018 | Kapadia et al. |
| 10,291,645 | B1 | 5/2019 | Frantzen et al. |
| 10,447,721 | B2 * | 10/2019 | Lasser ................... H04L 43/50 |
| 10,447,727 | B1 | 10/2019 | Hecht |
| 10,659,488 | B1 | 5/2020 | Rajasooriya et al. |
| 10,771,492 | B2 * | 9/2020 | Hudis ................... G06F 21/577 |
| 10,848,515 | B1 | 11/2020 | Pokhrel et al. |
| 10,868,825 | B1 | 12/2020 | Dominessy et al. |
| 10,956,566 | B2 | 3/2021 | Shu et al. |
| 10,958,667 | B1 | 3/2021 | Maida et al. |
| 11,089,040 | B2 | 8/2021 | Jang et al. |
| 11,159,555 | B2 | 10/2021 | Hadar et al. |
| 11,184,385 | B2 | 11/2021 | Hadar et al. |
| 2005/0193430 | A1 | 9/2005 | Cohen et al. |
| 2006/0037077 | A1 | 2/2006 | Gadde et al. |
| 2008/0044018 | A1 | 2/2008 | Scrimsher et al. |
| 2008/0301765 | A1 | 12/2008 | Nicol et al. |
| 2009/0077666 | A1 * | 3/2009 | Chen ................... G06Q 10/0631 726/25 |
| 2009/0307772 | A1 | 12/2009 | Markham et al. |
| 2010/0058456 | A1 * | 3/2010 | Jajodia ................... H04L 63/20 726/11 |
| 2010/0138925 | A1 | 7/2010 | Barai et al. |
| 2011/0035803 | A1 | 2/2011 | Lucangeli Obes et al. |
| 2011/0093916 | A1 * | 4/2011 | Lang ................... G06F 21/57 726/1 |
| 2011/0093956 | A1 | 4/2011 | Laarakkers et al. |
| 2013/0097125 | A1 | 4/2013 | Marvasti et al. |
| 2013/0219503 | A1 * | 8/2013 | Amnon ................ H04L 63/1433 726/25 |
| 2014/0082738 | A1 * | 3/2014 | Bahl ................... G06F 21/577 726/25 |
| 2015/0047026 | A1 | 2/2015 | Neil et al. |
| 2015/0106867 | A1 * | 4/2015 | Liang ................ H04L 63/1433 726/1 |
| 2015/0261958 | A1 * | 9/2015 | Hale ................... G06F 21/00 726/25 |
| 2015/0326601 | A1 * | 11/2015 | Grondin ............... G06F 21/6245 726/25 |
| 2016/0205122 | A1 | 7/2016 | Bassett |
| 2016/0277423 | A1 | 9/2016 | Apostolescu |
| 2016/0301704 | A1 | 10/2016 | Hassanzadeh et al. |
| 2016/0301709 | A1 | 10/2016 | Hassanzadeh et al. |
| 2017/0012836 | A1 | 1/2017 | Tongaonkar et al. |
| 2017/0032130 | A1 * | 2/2017 | Joseph Durairaj ... G06F 21/577 |
| 2017/0041334 | A1 | 2/2017 | Kahn et al. |
| 2017/0085595 | A1 | 3/2017 | Ng et al. |
| 2017/0163506 | A1 | 6/2017 | Keller |
| 2017/0230410 | A1 | 8/2017 | Hassanzadeh et al. |
| 2017/0318050 | A1 | 11/2017 | Hassanzadeh et al. |
| 2017/0324768 | A1 | 11/2017 | Crabtree et al. |
| 2017/0364702 | A1 | 12/2017 | Goldfarb et al. |
| 2017/0366416 | A1 | 12/2017 | Beecham et al. |
| 2018/0013771 | A1 | 1/2018 | Crabtree et al. |
| 2018/0103052 | A1 | 4/2018 | Choudhury et al. |
| 2018/0152468 | A1 | 5/2018 | Nor et al. |
| 2018/0183827 | A1 * | 6/2018 | Zorlular ............. H04L 63/1416 |
| 2018/0255077 | A1 | 9/2018 | Paine |
| 2018/0255080 | A1 * | 9/2018 | Paine .................. H04L 63/1425 |
| 2018/0295154 | A1 | 10/2018 | Crabtree et al. |
| 2018/0367548 | A1 | 12/2018 | Stokes, III et al. |
| 2019/0052663 | A1 * | 2/2019 | Lee ....................... H04L 63/20 |
| 2019/0052664 | A1 | 2/2019 | Kibler et al. |
| 2019/0141058 | A1 | 5/2019 | Hassanzadeh et al. |
| 2019/0182119 | A1 | 6/2019 | Ratkovic et al. |
| 2019/0188389 | A1 | 6/2019 | Peled et al. |
| 2019/0312898 | A1 | 10/2019 | Verma et al. |
| 2019/0373005 | A1 * | 12/2019 | Bassett ............. H04L 63/1441 |
| 2020/0014265 | A1 | 1/2020 | Hadar et al. |
| 2020/0042712 | A1 | 2/2020 | Foo et al. |
| 2020/0099704 | A1 | 3/2020 | Lee et al. |
| 2020/0128047 | A1 | 4/2020 | Biswas et al. |
| 2020/0137104 | A1 | 4/2020 | Hassanzadeh et al. |
| 2020/0175175 | A1 | 6/2020 | Hadar et al. |
| 2020/0177616 | A1 | 6/2020 | Hadar et al. |
| 2020/0177617 | A1 | 6/2020 | Hadar et al. |
| 2020/0177618 | A1 | 6/2020 | Hassanzadeh et al. |
| 2020/0177619 | A1 | 6/2020 | Hadar et al. |
| 2020/0296137 | A1 | 9/2020 | Crabtree et al. |
| 2020/0358804 | A1 | 11/2020 | Crabtree et al. |
| 2021/0006582 | A1 * | 1/2021 | Yamada ............. H04L 63/102 |
| 2021/0168175 | A1 | 6/2021 | Crabtree et al. |
| 2021/0248443 | A1 | 8/2021 | Shu et al. |
| 2021/0273978 | A1 | 9/2021 | Hadar et al. |

FOREIGN PATENT DOCUMENTS

| | | |
|---|---|---|
| EP | 2385676 | 11/2011 |
| EP | 2816773 | 12/2014 |

OTHER PUBLICATIONS

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ilwe.3ds.convtransportation-mobility/new-customer-experience>, 9 pages.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.

EP Search Report in European Application. No. 21159421.3, dated Jun. 30, 2021, 11 pages.

Foundations of Databases, 1st ed., Abiteboul et al. (eds.), 1995, Chapter 12, 38 pages.

GE.com [online], "Predix Platform," available on or before Nov. 16, 2018 via Internet Archive: Wayback Machine URL<https://web.archive.org/web/20181116005032/https://www.ge.com/digital/iiot-platform> retrieved on Jul. 9, 2021, retrieved from URL<https://www.ge.com/digital/iiot-platform>, 6 pages.

Hansen et al., "Model-in-the-Loop and Software-in-the-Loop Testing of Closed-Loop Automotive Software with Arttest," Informatik, 2017, 13 pages.

Hofner et al., "Dijkstra, Floyd and Warshall meet Kleene," Formal Aspects of Computing, Jul. 2012, 24(4-6):459-476.

Idika et al., "Extending attack graph-based security metrics and aggregating their application," IEEE Transactions on Dependable and Secure Computing, Jan./Feb. 2012, 9(1):75-85.

IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.

Inglos et al., "Practical Attack Graph Generation for Network Defense," 2006 22nd Annual Computer Security Applications Conference (ACSAC'06), Miami Beach, Florida, Dec. 11-15, 2006, 10 pages.

(56) References Cited

OTHER PUBLICATIONS

Li et al., "Cluster security research involving the modeling of network exploitations using exploitation graphs," Proceedings of the IEEE International Symposium on Cluster Computing and the Grid, Singapore, May 16-19, 2006, 11 pages.
Lippmann et al., "Validating and restoring defense in depth using attack graphs," Proceedings of the Military Communications Conference, Washington, DC, USA, Oct. 23-25, 2006, 10 pages.
Lu et al., "Ranking attack graphs with graph neural networks." Proceedings of the 5th International Conference on Information Security Practice and Experience, Xi'an, China, Apr. 13-15, 2009; Lecture Notes in Computer Science, Apr. 2009, 5451:345-359.
MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.
Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.
Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.
Noel et al., "CyGraph: Graph-Based Analytics and Visualization for Cybersecurity," Handbook of Statistics, Jan. 2016, 35:117-167.
Ortalo et al., "Experimenting with quantitative evaluation tools for monitoring operational security," IEEE Transactions on Software Engineering, Sep./Oct. 1999, 25(5):633-650.
Phillips et al., "A graph-based system for network-vulnerability analysis," Proceedings of the 1998 Workshop on New Security Paradigms, Charlottesville, Virginia, Sep. 22-26, 1998, 71-79.
Shi et al., "Normalized Cuts and Image Segmentation." IEEE Transactions on Pattern Analysis and Machine Intelligence, Aug. 2000, 22(8):888-905.
Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html> 11 pages.
SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.
Stanek et al., "Method of comparing graph differencing algorithms for software differencing," 2008 IEEE International Conference on Electro/Information Technology, Ames, Iowa, May 18-20, 2008, 482-487.
Swiler et al., "A graph-based network-vulnerability analysis system," Sandia National Laboratories, 1997, Tech. Rep. SAND97-3010/1, 25 pages.
TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.
The Fourth Industrial Revolution, 1st. ed., Schwab, Jan. 2017, 218 pages.
Vehicle Power Management, 1st ed., Zhang et al (eds.), Aug. 2011, Chapter 10, 27 pages.
Ward et al., "Threat Analysis and Risk Assessment in Automotive Cyber Security," SAE Int. J. Passeng. Cars Electron. Electr. Systems, May 2013, 6(2):507-513.
Wikipedia.org [online], "5G," last updated Jul. 9, 2021, retrieved on Jul. 9, 2021, retrieved from URL<https://en.wikipedia.org/wiki/5G>, 29 pages.
Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.
Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.
Wikipedia.org [online], "Digital twin," last updated Jul. 8, 2021, retrieved on Jul. 9, 2021, retrieved from URL<https://en.wikipedia.org/wiki/Digital_twin>, 13 pages.
Yi et al., "Overview on attack graph generation and visualization technology," 2013 International Conference on Anti-Counterfeiting, Security and Identification (ASID), Shanghai, China, Oct. 25-27, 2013, 6 pages.
Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.
Zhao et al., "Attack graph analysis method for large scale network security hardening," J. Front. Comput. Sci. Technology, 2018, 12(2):263-273 (with English Abstract).
EP Search Report in European Application No. EP 19212981, dated Mar. 4, 2020, 6 pages.
Ullah et al., "Towards Modeling Attacker's Opportunity for Improving Cyber Resilience in Energy Delivery Systems", Resilience Week, Aug. 2018, pp. 100-107.
Borgatti et al., "A Graph-theoretic perspective on centrality," Social Networks, Oct. 2006, 28(4):466-484.
EP Search Report in European Application. No. EP20185251, dated Oct. 21, 2020, 7 pages.
Wang et al., "A Network Vulnerability Assessment Method Based on Attack Graph," 2018 IEEE 4th International Conference on Computer and Communications. Dec. 7-10, 2018, Chengdu, China, 1149-1154.
Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.
Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm, 7 pages.
Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.
Barik et at, "Attack Graph Generation and Analysis Techniques." Defence Science Journal, Nov. 2016, 66(6):559-567.
Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.
Bonacich, "Power and Centrality: A Family of Measures," American Journal of Sociology, Mar. 1987, 92(5):1170-1182.
Cohen-Addad et ah, "Hierarchical Clustering: Objective Functions and Algorithms," Journal of the ACM, Jun. 2019, 66(4):26, 42 pages.
Fundamentals of Business Process Management, 2nd ed., Dumas et al. (eds.), 1998, 546 pages.
Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.
Manning Free Content Center [online], "Building Your Vocabulary," dated May 19, 2017, retrieved on Jun. 3, 2020, retrieved from. URL <https://freecontent.manning.com/building-your-vocabulary/>, 10 pages.
National Institute of Standards and Technology [online], "National Vulnerability Database," last updated Jun. 2, 2020, retrieved on Jun. 3, 2020, retrieved from URL<https://nvd.nist.gov/>, 4 pages.
Networks: An Introduction, Newman (ed.), May 2010, 789 pages.
Ou et al., "A Scalable Approach to Attack Graph Generation," Proceedings of the 13th ACM Conference on Computer and Communication Security, Oct. 2006, 336-345.

(56) References Cited

OTHER PUBLICATIONS

Ou et al., "MulVAL: A Logic-based Network Security Analyzer," 14th USENIX Security Symposium, Aug. 2005, Baltimore, MD, USA, 16 pages.

Process Mining, 1st ed., van der Aalst, 2011, Chapters 5-6, 63 pages.

Sourceforge.net [online], "XSB," last updated Oct. 29, 2017, retrieved on Jun. 3, 2020, retrieved from URL <http://xsb.sourceforge.net/>, 2 pages.

The MITRE Corporation [online], "MITRE ATT&CK," last updated May 27, 2020, retrieved on Jun. 3, 2020, retrieved from URL <https://attack.mitre.org/>, 3 pages.

Wang et al., "Exploring Attack Graph for Cost-benefit Security Hardening: A Probabilistic Approach," Computers & Security, Feb. 2013, 32:158-169.

Wikipedia.org [online], "Active Directory," last updated Jun. 1, 2020, retrieved on Jun. 3, 2020, retrieved from URL <https://en.wikipedia.org/wiki/Active_Directory>, 14 pages.

Wikipedia.org [online], "Backward Chaining," last updated Nov. 16, 2019, retrieved on June 3. 2020, retrieved from URL <https://en.wikipedia.org/wiki/Backward_chaining>, 3 pages.

Wikipedia.org [online], "Cartesian Product," last updated Feb. 28, 2020, retrieved on Jun. 3, 2020, retrieved from URL <https://en.wikipedia.org/wiki/Cartiesian_products>, 9 pages.

Wikipedia.org [online], "Centrality," last updated May 29, 2020, retrieved on Jun. 3, 2020, retrieved from URL <https://en.wikipedia.org/wiki/Centrality>, 15 pages.

Wikipedia.org [online], "Flood Fill," last updated Dec. 24, 2019, retrieved on Jun. 3, 2020, retrieved from URL <https://en.wikipedia.org/wiki/Flood_fill>, 7 pages.

Wikipedia.org [online], "Forward Chaining," last updated Nov. 18, 2019, retrieved on Jun. 3, 2020, retrieved from URL <https://en.wikipedia.org/wiki/Forward_chaining>, 3 pages.

Wikipedia.org [online], "Look-ahead (backtracking)," last updated May 23, 3030, retrieved on Jun. 3, 2020, retrieved from URL <https://en.wikipedia.org/wiki/Look-ahead_(backtracking)>, 3 pages.

Wikipedia.org [online], "SCADA," last updated Jun. 2, 2020, retrieved on Jun. 3, 2020, retrieved from URL <https://en.wikipedia.org/wiki/SCADA>, 12 pages.

EP Search Report in European Application No. EP13290145, dated Nov. 12, 2013, 2 pages.

EP Search Report in European Application No. EP19212974, dated Feb. 14, 2020, 8 pages.

Abraham et al., "Cyber Security Analytics: A Stochastic Model for Security Quantification Using Absorbing Markov Chains," Journal of Communications, Dec. 2014, 9(12):899-907.

Atoum et al., "A holistic cyber security implementation framework," Information Management & Computer Security, Jul. 2014, 22(3):251-264.

Fielder et al., "Decision support approaches for cyber security investment," Decision Support Systems, Jun. 2016, 86:13-23.

Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.

Grieves, "Virtually Intelligent Product Systems: Digital and Physical Twins", Complex Systems Engineering: Theory and Practice, Jul. 2019, 256:175-200.

Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.

Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.

Husák et al., "Survey of Attack Projection, Prediction, and Forecasting in Cyber Security," IEEE Communications Surveys & Tutorials, Sep. 24, 2018, 21(1):640-660.

International Organization for Standardization, "International Standard: ISO/IEC 27001," ISO/IEC 27001:2013(E), Oct. 1, 2013, 29 pages.

Joint Task Force Transformation Initiative, "Security and Privacy Controls for Federal Information Systems and Organizations," National Institute of Standards and Technology Special Publication 800-53, Revision 4, Jan. 22, 2015, 462 pages.

Khouzani et al., "Scalable min-max multi-objective cyber-security optimization over probabilistic attack graphs", European Journal of Operational Research, Nov. 1, 2019, 278(3):894-903.

Schatz et al.. "Economic valuation for information security investment: a systematic literature review," Information Systems Frontiers, Apr. 18, 2016, 19:1205-1228.

Shandilya et al., "Use of Attack Graphs in Security Systems", Hindawi Journal of Computer Networks and Communications, Oct. 20, 2014, 2014:818957, 14 pages.

Strom et al., "MITRE ATT&CK™: Design and Philosophy", The MITRE Corporation, Jul. 2018, 37 pages.

Wikipedia.org [online], "Centrality," last updated Oct. 18, 2020, retrieved on Oct. 26, 2020, retrieved from URL<https://en.wikipedia.org/wiki/Centrality>, 15 pages.

Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.

Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.

Wikipedia.org [online], "Traffic flow," last updated Oct. 19, 2020, retrieved on Oct. 26, 2020, retrieved from URL<https://en.wikipedia.org/wiki/Traffic_flow>, 41 pages.

Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.

Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.

You et al., "A Review of Cyber Security Controls from An ICS Perspective," Proceedings of 2018 International Conference on Platform Technology and Service (PlatCon), Jan. 29-31, 2018, Jeju, South Korea, 5 pages.

Zeng et al., "Survey of Attack Graph Analysis Methods from the Perspective of Data and Knowledge Processing." Hindawi Security and Communication Networks, Dec. 26, 2019, 2019:2031063, 17 pages.

Zhang et al., "Optimal Decision-Making Approach for Cyber Security Defense Using Game Theory and Intelligent Learning," Security and Communication Networks. Dec. 23, 2019, 2019:3038586, 17 pages.

EP Search Report in European Application No. EP19212976, dated Feb. 14, 2020, 8 pages.

Purvine et al., "A Graph-Based Impact Metric for Mitigating Latheral Movement Cyber Attacks", Automated Descision Making for Active Cyber Defence, Oct. 2016. pp. 45-52.

Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).

X. Li, C. Zhang, T. Jung, J. Qian and L. Chen, "Graph-based privacy-preserving data publication," IEEE Infocom 2016—The 35th Annual IEEE International Conference on Computer Communications, 2016, pp. 1-9, doi: 10.1109/IN F000M.2016.7524584. (Year: 2016).

Alvarenga et al., "Discovering Attack Strategies Using Process Mining," Presented at Proceedings of The Eleventh Advanced International Conference on Telecommunications, Brussels, Belgium, Jun. 21-26, 2015, 119-125.

Chen et al., "Distributed Attack Modeling Approach Based on Process Mining and Graph Segmentation," Entropy, Sep. 2020, 22(9):1026, 21 pages.

Coltellese et al., "Triage of IoT Attacks Through Process Mining," Presented at Proceedings of On the Move to Meaningful Internet (56) References Cited

OTHER PUBLICATIONS

Systems Conference 2019, Rhodes, Greece, Oct. 21-25, 2019; Lecture Notes in Computer Science, Oct. 2019, 11877:326-344.

IEEE, "IEEE Standard for eXtensible Event Stream (XES) for Achieving Interoperability in Event Logs and Event Stream," IEEE Std 1849™-2016, Sep. 22, 2016, 50 pages.

Murata, "Petri Nets: Properties, Analysis and Applications," Proceedings of the IEEE, Apr. 1989, 77(4):541-580.

Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.

Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/>, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.

PM4Py.de [online]. "DFG: Process Discovery using Directly-Follows Graphs," available on or before Mar. 7, 2019 via Internet Archive: Wayback Machine URL<https://web.archive.org/web/20190307062454/http://pm4pypads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.

PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.

Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.

Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.

Wikipedia.org [online], "Depth-first search," last updated Jun. 16, 2021, retrieved on Jul. 28, 2021, retrieved from URL<https://en.wikipedia.org/wiki/Depth-first_search>, 8 pages.

* cited by examiner

LEVERAGING ATTACK GRAPHS OF AGILE SECURITY PLATFORM

CROSS-REFERENCE TO RELATED APPLICATIONS

This application claims priority to U.S. Prov. App. No. 62/774,516 filed on Dec. 3, 2018, the disclosure of which is incorporated herein by reference in the entirety.

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel. In some instances, for relatively large networks, for example, a large number of alerts can be displayed. Alerts, however, are not all equal. For example, one alert can reflect an event that is less critical than an event reflected by another alert. Multiple alerts can result in dilution, and expending resources on less critical issues.

SUMMARY

Implementations of the present disclosure are directed to an agile security platform for enterprise-wide cyber-security. More particularly, implementations of the present disclosure are directed to an agile security platform that determines asset vulnerability of enterprise-wide assets including cyber-intelligence and discovery aspects of enterprise information technology (IT) systems and operational technology (OT) systems, asset value, and potential for asset breach including hacking analytics of enterprise IT/OT systems. The agile security platform of the present disclosure executes in a non-intrusive manner.

In some implementations, actions include receiving, from an agile security platform, attack graph (AG) data representative of one or more AGs, each AG representing one or more lateral paths within an enterprise network for reaching a target asset from one or more assets within the enterprise network, processing, by a security platform, data from one or more data sources to selectively generate at least one event, the at least one event representing a potential security risk within the enterprise network, and selectively generating, within the security platform, an alert representing the at least one event, the alert being associated with a priority within a set of alerts, the priority being is based on the AG data. Other implementations of this aspect include corresponding systems, apparatus, and computer programs, configured to perform the actions of the methods, encoded on computer storage devices.

These and other implementations can each optionally include one or more of the following features: the alert is associated with an asset and is assigned an initial priority, and the priority includes an elevated priority relative to the initial priority based on the AG data; the initial priority is elevated to the priority in response to determining that the asset is included in a critical path represented within the AG data; the event is selectively generated based on filtering a plurality of potential events based on the AG data; each AG is generated by a discovery service of the agile security platform, the discovery service detecting assets using one or more adaptors and respective asset discovery tools that generate an asset inventory and a network map of the enterprise network; each AG is associated with a target within the enterprise network, the target being selected based on a disruption occurring in response to an attack on the target; the disruption is based on one or more metrics; and the one or more metrics comprise loss of technical resources, physical losses, disruption in services, and financial losses.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to an agile security platform for enterprise-wide cyber-security. More particularly, implementations of the present disclosure are directed to an agile security platform that determines asset vulnerability of enterprise-wide assets including cyber-intelligence and discovery aspect of enterprise information technology (IT) systems, and enterprise operational technology (OT) systems, asset value, and potential for asset breach including hacking analytics of enterprise IT/OT systems performed in a non-intrusive manner. In general, and as described in further detail herein, the agile security platform of the present disclosure prioritizes risks and respective remediations based on vulnerabilities of assets within an enterprise network (e.g., cyber intelligence and discovery aspect of IT/OT systems), the value of the assets, and the probability that the assets will be breached.

More particularly, and as described in further detail herein, implementations of the present disclosure are directed to leveraging one or more attack graphs (AGs) generated by the agile security platform to prioritize alerts. In some implementations, data provided from the one or more AGs is correlated with security information and event management (STEM) data and/or security operations center (SOC) data to identify probable and/or high-risk attack paths, and prioritize alerts associated with such attack paths. For example, one or more AGs can be leveraged to decrease a number of irrelevant alerts and increase visibility of relatively critical alerts. In this manner, implementations of the present disclosure optimize time utilization, improve response times, and increase quality level in attending to real incidents.

In some implementations, the agile security platform of the present disclosure enables continuous cyber and enterprise-operations alignment controlled by risk management. The agile security platform of the present disclosure improves decision-making by helping enterprises to prioritize security actions that are most critical to their operations. In some implementations, the agile security platform combines methodologies from agile software development lifecycle, IT management, development operations (DevOps), and analytics that use artificial intelligence (AI). In some implementations, agile security automation bots continuously analyze attack probability, predict impact, and recommend prioritized actions for cyber risk reduction. In this manner, the agile security platform of the present disclosure enables enterprises to increase operational efficiency and availability, maximize existing cyber-security resources, reduce additional cyber-security costs, and grow organizational cyber resilience.

As described in further detail herein, the agile security platform of the present disclosure provides for discovery of IT/OT supporting elements within an enterprise, which elements can be referred to as configuration items (CI). Further, the agile security platform can determine how these CIs are connected to provide a CI network topology. In some examples, the CIs are mapped to process and services of the enterprise, to determine which CIs support which services, and at what stage of an operations process. In this manner, a services CI topology is provided.

In some implementations, the specific vulnerabilities of each CI are determined, and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

Figure 1:
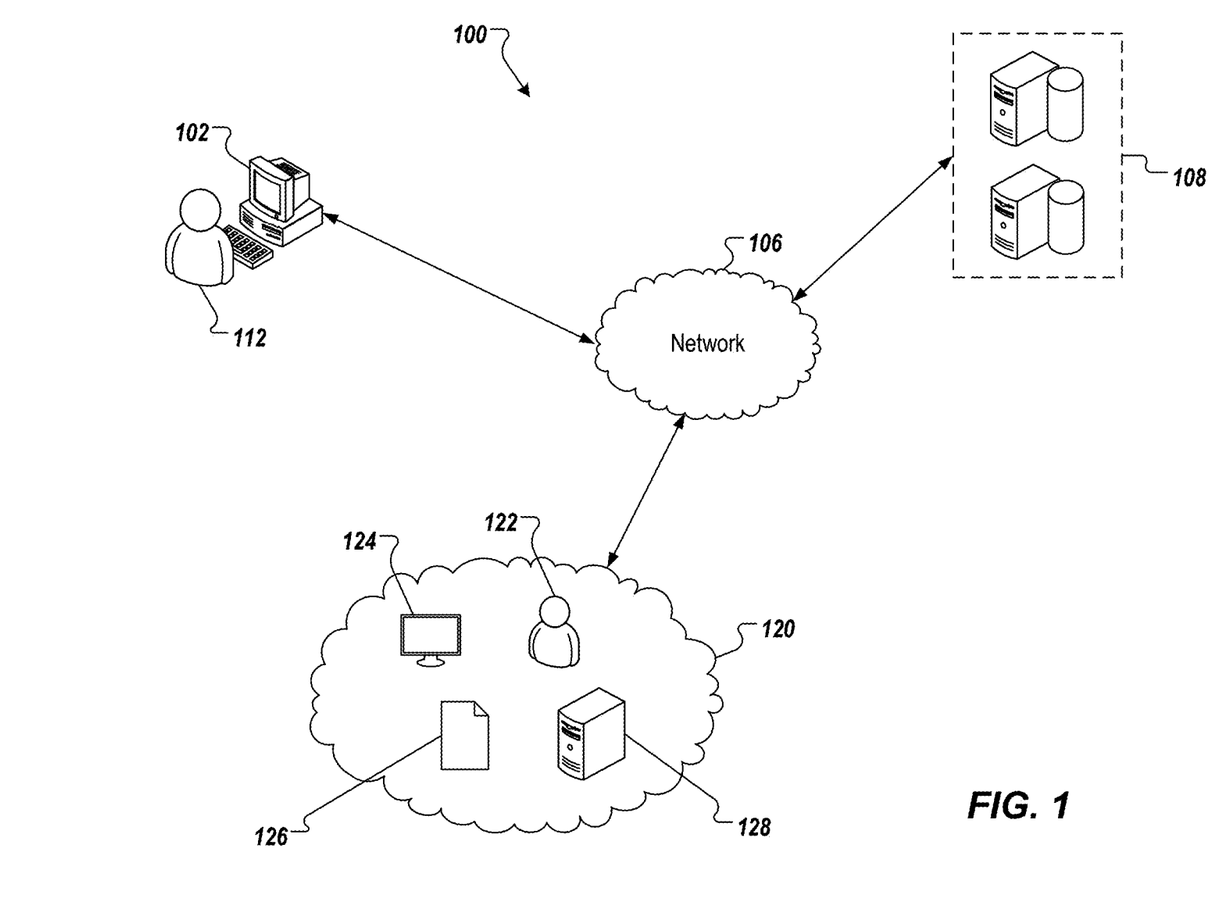
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120.

In some implementations, the agile security platform of the present disclosure is hosted within the server system 108, and monitors and acts on the enterprise network 120, as described herein. More particularly, and as described in further detail herein, the agile security platform detects IT/OT assets and generates an asset inventory and network maps, as well as processing network information to discover vulnerabilities in the enterprise network 120, and provide a holistic view of network and traffic patterns. In some examples, the enterprise network 120 includes multiple assets. Example assets include, without limitation, users 122, computing devices 124, electronic documents 126, and servers 128.

In some implementations, the agile security platform provides one or more dashboards, alerts, notifications and the like to cyber-security personnel that enable the cyber-security personnel to react to and remediate security relevant events. For example, the user 112 can include a cybersecurity expert that views and responds to dashboards, alerts, and/or notifications of the agile security platform using the client device 102.

In accordance with implementations of the present disclosure, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform of the present disclosure addresses lateral movements across the stack. Through devices, communication channels (e.g., email), and/or operation systems, vulnerabilities are addressed within the context of a service, and a cyber kill chain to a target in the operation vertical, generating operation disturbance by manipulation of data. The notion of a CI assists in mapping dependencies between IT elements within a configuration management DB (CMDB). A so-called security CI (SCI) maps historical security issues of a certain managed security element and mapped into a security aspect of a digital twin.

As a result, a stack of technologies is defined, and is configured in a plug-in reference architecture (replaceable and extendible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a big bang decision may be not relevant to rising risks as they evolve. Prioritization according to value is the essence of this phase. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to self-managed by the operations owners and systems users.

In the agile security platform of the present disclosure, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

Figure 2:
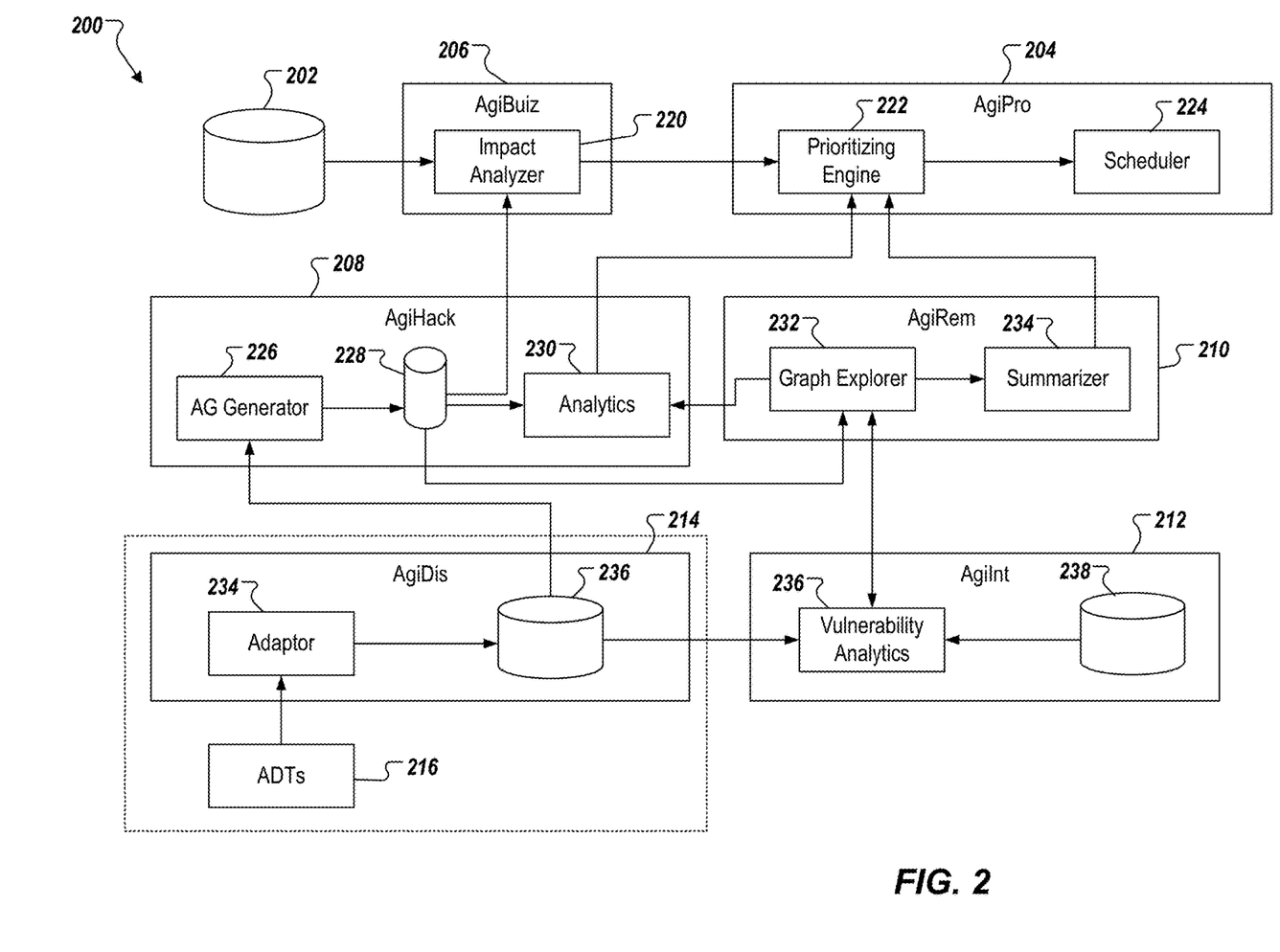
FIG. 2 depicts an example conceptual architecture of an agile security platform of the present disclosure.

FIG. 2 depicts an example conceptual architecture 200 of an agile security (AgiSec) platform in accordance with implementations of the present disclosure. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 234, and an asset/vulnerabilities knowledge base 236. In some examples, the adaptor 234 is specific to an asset discovery tool (ADT) 216. Although a single ADT 216 is depicted, multiple ADTs can be provided, each ADT being specific to an IT/OT site within the enterprise network. Because each adaptor 234 is specific to an ADT 216, multiple adaptors 234 are provided in the case of multiple ADTs 216.

In some implementations, the AgiDis service 214 detects IT/OT assets through the adaptor 234 and respective ADT 216. The discovered assets can be used to generate an asset inventory, and network maps. In general, the AgiDis service 214 can be used to discover vulnerabilities in the enterprise network, and a holistic view of network and traffic patterns. In some implementations, this is achieved through passive network scanning and device fingerprinting through the adaptor 234 and ADT 216. The AgiDis service 214 provides information about device models.

In the example of FIG. 2, the AgiInt service 212 includes a vulnerability analytics module 236 and a threat intelligence knowledge base 238 (e.g., CVE, CAPEC, CWE, Maglan Plexus, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets.

In the example of FIG. 2, the AgiHack service 208 includes an attach graph (AG) generator 226, an AG database 228, and an analytics module 230. In general, the AgiHack service 208 constructs AGs and evaluates hacking exploitation complexity. In some examples, the AgiHack service 208 understand attack options, leveraging the vulnerabilities to determine how a hacker would move inside the network and identify targets for potential exploitation. The AgiHack service 208 proactively explores adversarial options and creates AGs representing possible attack paths from the adversary's perspective. The AgiHack service 208 provides both active and passive vulnerability scanning capabilities to comply with constraints, and identifies device and service vulnerabilities, configuration problems, and aggregate risks through automatic assessment.

In further detail, the AgiHack service 208 provides rule-based processing of data provided from the AgiDis service 214 to explore all attack paths an adversary can take from any asset to move laterally towards any target (e.g., running critical operations). In some examples, multiple AGs are provided, each AG corresponding to a respective target within the enterprise network. Further, the AgiHack service 208 identifies possible impacts on the targets. In some examples, the AG generator 226 uses data from the asset/vulnerabilities knowledge base 236 of the AgiDis service 214, and generates an AG. In some examples, the AG graphically depicts, for a respective target, all possible impacts that may be caused by a vulnerability or network/system configuration, as well as all attack paths from anywhere in the network to the respective target. In some examples, the analytics module 230 processes an AG to identify and extract information regarding critical nodes, paths for every source-destination pair (e.g., shortest, hardest, stealthiest), most critical paths, and critical vulnerabilities, among other features of the AG. If remediations are applied within the enterprise network, the AgiHack service 208 updates the AG.

In the example of FIG. 2, the AgiRem service 210 includes a graph explorer 232 and a summarizer 234. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remediation actions by exploring attack graph and paths.

In further detail, for a given AG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 234 is provided as a natural language processing (NLP) tool that extracts concise and salient text from large/unstructured threat intelligence feeds. In this manner, the AgiSec platform can convey information to enable users (e.g., security teams) to understand immediate remediation actions corresponding to each issue.

In the example of FIG. 2, the AgiBuiz service 204 includes an impact analyzer 220. In general, the AgiBuiz service 204 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 204 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber attacks with those caused by system unavailability due to shutdown time for replacing/patching critical assets.

In the example of FIG. 2, the AgiPro service 206 includes a prioritizing engine 222 and a scheduler 224. In some implementations, the AgiPro service 206 prioritizes the remediation recommendations based on their impact on the AG size reduction and risk reduction on the value. In some examples, the AgiPro service 206 determines where the enterprise should preform security enforcement first, in order to overall reduce the risks discovered above, and evaluate impact and probability to perform harm based on the above lateral movements by moving from one CI to another. In some examples, the AgiPro service 206 prioritizes remediation actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remediation actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

In some implementations, the AgiSec platform of the present disclosure provides tools that enable user interaction with multi-dimensional (e.g., 2D, 3D) visualizations of computational graph data and its derived computed attributes. In some examples, topological heat maps can be provided and represent ranks and values of the derived attributes in order to expedite search capabilities over big data. In some examples, the tools also enable searching for key attributes of critical nodes, nodes representing CIs. In some implementations, these visualizations are provided within a computer or immersive environment, such as augmented reality (AR), mixed reality (MR), or virtual reality (VR). The visualizations of the present disclosure improve the ability of an automated (employing contour lines) or human interactive (based on segmented regional selection) to employ search and filtering capabilities on big data graph topology aimed at quickly identifying quickly critical nodes in the graph which its derived (computed) attributes serve as the search criteria. The attributes to be highlighted differ and are configurable, as such, different contour lines appear based on different criteria. In some examples, the perceived importance of an attribute relative to other attributes can be controlled in view of a scenario, vertical importance, or any domain-specific consideration, through weighed attributes. Further, similar contour lines can be identified in other nearby nodes on the graph. For an immersive visualization experience, matching leading contour lines can show hidden paths, or pattern of similar geometric shape and form, hence drive improved comprehension for humans.

In the context of cyber security, a critical node, also referred to herein as cardinal node, can represent a CI that is a key junction for lateral movements within a segmented network. Namely, once acquired as a target, the cardinal node can trigger multiple new attack vectors. Cardinal nodes can also be referred to as "cardinal faucet nodes." Another node will be one that many hackers' lateral movements can reach, yet it cannot lead to an additional node. Such nodes can be referred to as "cardinal sink nodes." In the network graph, the more edges from a cardinal faucet node to other nodes, the higher the faucet attribute is. The more incoming edges to a cardinal node, the higher the sink attribute is. If a node has both sink and faucet values in correlation, the more overall cardinal this node becomes to the entire examined graph topology and is defined as a critical target to be acquired since it provides control over multiple nodes in the graphs. In certain situations, the search for a faucet attribute is more important than a sink attribute. Such as a case of finding what node to block first to prevent a segregation of an attack outbreak. In case of finding what is very hard to protect, the more sink attributes matter more.

Figure 3:
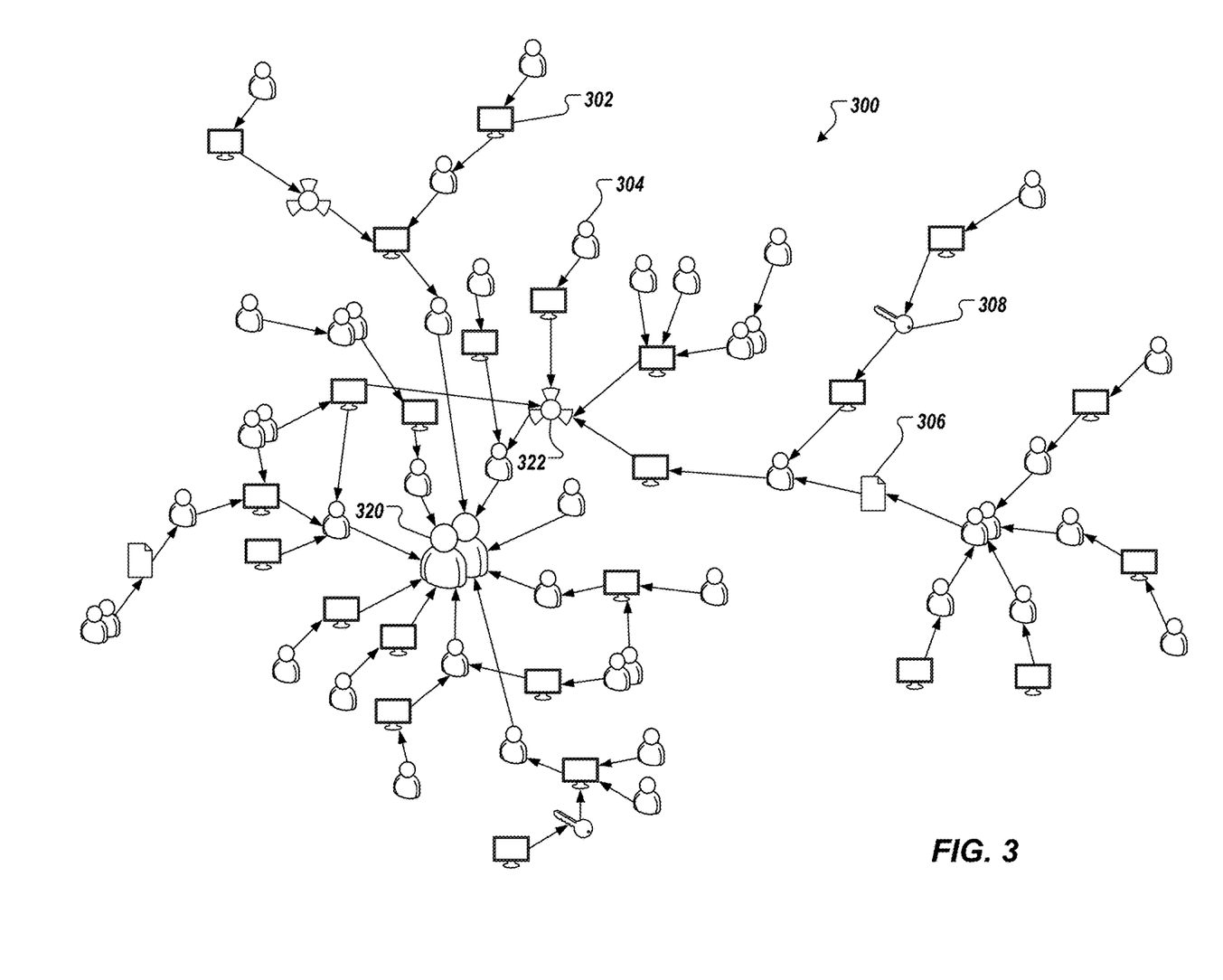
FIG. 3 depicts an example attack graph in accordance with implementations of the present disclosure.

FIG. 3 depicts an example portion 300 of an AG in accordance with implementations of the present disclosure. In some implementations, and AG is provided based on the network topology of the enterprise network. For example, the AgiHack service 208 of FIG. 2 can generate one or more AGs based on information provided from the AgiDis service 214. In some examples, an AG includes nodes and edges (also referred to as arches) between nodes. In some examples, a node can be associated with a semantic type. In the example domain of cyber-security and network topology, example semantic types can include, without limitation, computer 302, user 304, file 306, and key 308.

In some examples, an edge can include an incoming (sink) edge (e.g., an edge leading into a node from another node) or an outgoing (faucet) edge (e.g., an edge leading from a node to another node). In some examples, each edge can be associated with a respective activity. In the example domain of cyber-security and network topology, example activities can include, without limitation, logon (credentials), operating system access, and memory access. In some examples, each edge can be associated with a respective weight. In some examples, the weight of an edge can be determined based on one or more features of the edge. Example features can include a traffic bandwidth of the edge (e.g., how much network traffic can travel along the edge), a speed of the edge (e.g., how quickly traffic can travel from one node to another node along the edge), a difficulty to use the edge (e.g., network configuration required to use the edge), and a cost to use the edge (e.g., in terms of technical resources, or financial cost). In some examples, and as described in further detail below, the weights of the edges are determined relative to each other (e.g., are normalized to 1).

In some implementations, each node can be associated with a set of attributes. Example attributes can include, without limitation, the semantic type of the node, a number of incoming edges, a number of outgoing edges, a type of each of the edges, a weight of each of the edges, and the like. In some implementations, one or more values for a node can be determined based on the set of attributes of the node, as described in further detail herein.

The example portion 300 of the AG includes tens of nodes (approximately 70 nodes in the example of FIG. 3). It is contemplated, however, that an AG can include hundreds, or thousands of nodes. In some examples, the example portion 300 of the AG is a visualization of part of the AG based on one or more filter parameters. In some examples, a user can define filter parameters that can be used to identify cardinal nodes within an AG, and segments of the AG that may be relevant to a cardinal node. In the example of FIG. 3, a node 320 can be determined to be a cardinal node based on one or more filter parameters (e.g., no outgoing edges, and more than three incoming edges). In some examples, other depicted nodes include nodes along lateral paths that lead to a cardinal node.

In the example of FIG. 3, the node 320 can represent administrator credentials, a relatively high-value target within an enterprise network, and all other edges and nodes define the paths within the AG that lead to the node 320. While the AG can include hundreds, or thousands of nodes and edges, the example portion 300 is provided based on identification of the node 320 as the cardinal node (e.g., based on filter parameters) and all paths of the AG that lead to the node 320. In this manner, the portion 320 provides a more easily consumable visualization than depicting an entirety of the AG.

In some implementations, other nodes besides the cardinal node can be identified as relatively important nodes (e.g., relative to other depicted nodes). In some examples, the relative importance of a node can be determined based on attack paths that lead to a cardinal node. In the example of FIG. 3, a node 322 can be determined to be a relatively important node. Starting from the node 322, there is a single attack path to the node 320. However, there are approximately ten different attack paths that the node 322 is included in. Consequently, security resources could be concentrated on the node 322, as opposed to nodes upstream of the node 322 in the multiple attack paths. In this manner, security resources can more efficiently protect the node 320, as described in further detail herein.

Further, AGs can change over time. That is, there is a multi-dimensional aspect to AGs with one dimension including time. For example, and with continued reference to the example of FIG. 3, the node 320 can be considered a cardinal node based on the filter parameters. At another time, the node 320 might no longer be considered a cardinal node. For example, between the first time and the second time, values of attributes may have changed for nodes, some nodes may have been removed from the network (e.g., computers retired, users removed), and/or some nodes may have been added to the network (e.g., new computers/users).

As introduced above, and in accordance with implementations of the present disclosure, a node of the AG can be identified as a cardinal node. In some examples, a cardinal node is a node that is deemed to be a key junction, and therefore, a target of attack within a network. As described in further detail herein, implementations of the present disclosure enable searching for cardinal nodes over a graph database based on attributes and weights.

In some implementations, an incoming value (IV) of each node of an AG is calculated. In some examples, the IV of a respective node k ($IV_k$) is calculated based on node attributes (e.g., a number of incoming edges, semantic types of the edges). The following example relationship is provided:

$$IV_k = \Sum_{j=1}^{m}(WArchSType_j \times \Sum_{i=1}^{n} ValArchSType_{ij}) \quad (1)$$

where $$\Sum_{i=1}^{n} ValArchSType_{ij} \geq 0 \quad (2)$$

where n is the number of edges (arches) per semantic type S(j) that are either outgoing for the case of a faucet node, or incoming for the case of a sink node, m is the total number of semantic types S per the node k, and $1 \leq j \leq m$, and $1 \leq k \leq K$, where K is the total number of nodes being considered (e.g., in a segmented section of the graph). The example Equation 1 above applies to outgoing or incoming edges respectively.

Another example relationship can be provided as:

$$1 = \Sum_{j=1}^{v}(WArchSType_j) \quad (3)$$

Namely all weights are normalized to unity and any change to one weight value affects the normalization of other weights. In some example, v is all of the weights of all of the semantic types of arches in outgoing or incoming arches respectively.

In some implementations, an outgoing value (OV) of each node of the AG is calculated, as described above for IV (e.g., IV is calculated for the incoming edges, and OV is calculated for the outgoing edges). That is, the OV of a respective node k ($OV_k$) is calculated based on node attributes, a number of outgoing edges, and semantic types of the edges. In some implementations, an overall value of a respective node is determined based on the node's IV and OV values (e.g., as a sum, a weighted sum, an average, a weighted average).

As introduced above, implementations of the present disclosure are directed to leveraging one or more AGs generated by the AgiSec platform to optimize alerts generated by the AgiSec platform. In some implementations, data provided from the one or more AGs is correlated with STEM data and/or security operations center SOC data to identify probable and/or high-risk attack paths, and prioritize alerts associated with such attack paths.

In some implementations, a SIEM platform is provided and combines security information management (SIM) and security event management (SEM). In some examples, the STEM platform provides real-time analysis of security alerts generated by applications and/or network hardware. Example SIEM platforms include, without limitation, Splunk Enterprise Security (ES) provided by Splunk Inc. of San Francisco, Calif., IBM QRadar STEM provided by International Business Machines Corporation of Armonk, N.Y., and ArcSight STEM provided by eSec Forte Technologies Pvt. Ltd. of New Dehli, India. It is contemplated that implementations of the present disclosure can be realized with any appropriate SIEM platform.

In general, the SIEM platform provides a suite of functionality (e.g., computer-executable programs) for managing, analyzing and correlating multiple sources of security information and log files in a network. Example functionality can include, without limitation, data aggregation, correlation, alerting, and dashboards. For example, the SIEM platform can include data aggregation, in which log management aggregates data from multiple sources within the network to provide monitored data that is consolidated and analyzed to help avoid missing critical events occurring within the network. Example sources can include network, security, servers, databases, and applications. As another example, the STEM platform can include correlation that processes data to find common attributes, and links events together into meaningful bundles. In some examples, correlation enables the performance of a variety of correlation techniques to integrate different sources. As another example, the STEM platform provides alerting, which can include automated analysis of correlated events, and generating alerts to relevant personnel. As still another example, the STEM platform can provide one or more dashboards that present event data and alerts to users.

In some implementations, the SIEM platform detects occurrence of and is responsive to events occurring within the network. Example events can include, without limitation, log-in attacks (e.g., brute-force attacks, password guessing, misconfigured applications), firewall attacks (e.g., firewall drop/reject/deny events), network intrusion attempts, host intrusion attempts, and malware detection (e.g., virus, spyware). In some examples, an alert can be generated in response to occurrence of an event. In some implementations, the SIEM platform can associate one or more assets within the network with one or more alerts.

In some examples, the STEM platform can indicate a criticality of an alert (e.g., an event that underlies the alert). In some examples, a criticality of an alert can be based on confidentiality, integrity and availability (CIA) scoring. In general, confidentiality can be described as a set of rules that limits access to information, integrity can be described as an assurance that the information is trustworthy and accurate, and availability can be described as a guarantee of reliable access to the information. For a given asset underlying an alert, each of these CIA elements can have a score associated therewith. In this manner, a score indicating a relative importance of the asset can be provided, and the scores can be used to prioritize alerts. However, such techniques for prioritizing alerts can be based on static information that may be manually input be users. Further, while such techniques can prioritize alerts, they do not reduce the number of alerts that might be presented.

In accordance with implementations of the present disclosure, AG data can be provide from the AgiSec platform to a SIEM platform, and can be used to filter SIEM data and/or prioritize alerts provided from the SIEM platform.

For example, and as described above, an AG can be provided for each of a plurality of high-value targets (e.g., crown jewels) within a network. Referring again to the example of FIG. 3, the node 320 can represent administrator credentials, a relatively high-value target within an enterprise network, and all other edges and nodes define the paths within the AG that lead to the node 320. In some examples, a value of a target can be determined based on disruption to the enterprise, which can be provided on one or more metrics. Example metrics can include, without limitation, loss of technical resources (e.g., computing devices, database systems, software systems), physical losses (e.g., assets being physically destroyed), and financial losses (e.g., disruptions to enterprise that result in financial loss). An enterprise network can have multiple high-value targets, and an AG can be provided for each. In some examples, within each AG, one or more critical paths can be identified, a critical path being a path within the AG to the high-value target. In some examples, a path is determined to be critical, if traversal along the path could ultimately lead to the high-value target. If, for example, a path leads to a node that is isolated from the high-value target, the path is not deemed to be critical.

At a high-level, implementations of the present disclosure address problems in SIEM platforms, such as reducing the number of false positives in alerts. As described in further detail herein, implementations of the present disclosure enable use of AG information to automate prioritization of alerts, and filter data that alerts are triggered on. Accordingly, implementations of the present disclosure correlate data between different domains, the SIEM domain, and the AgiSec domain. For example, some assets along a lateral movement path within an AG may be more critical than others. An asset that is closer to target may be considered more critical than an asset that is further from the target. In some examples, AG data provided to the STEM platform can include asset information (e.g., IP address, host name, version, operating system, server type) and whether the asset is one a critical path.

In some implementations, AG data can be used in multiple scenarios within the STEM platform, each scenario addressing a philosophy for addressing security issues within enterprise networks. In a first scenario, also referred to as an upstream scenario, security issues can be proactively addressed prior to occurrence of any events. In a second scenario, also referred to as a downstream scenario, events are addressed in response to occurrences.

With regard to the first scenario, a defensive posture can be considered, in which one or more simulations are provided for virtual adversaries and potential attack paths to targets. In this manner, a set of potential attacks can be defined. For each potential attack, data can be provided that indicates assets that would be involved in the potential attack. In some examples, AG data can be provided to and can be compared to the data provided in the set of potential attacks. In some examples, the AG data can indicate relative closeness of assets in terms of propagation of an attack toward a high-value target. In some examples, the AG data can indicate any assets (e.g., computers, devices, systems) in a potential attack that are also included in a critical path of an AG. If an asset is included in a potential attack and is along a critical path, this can be indicated as such within the data (e.g., a critical path flag can be set for the asset). In some examples, if an attack occurs, the AG data can be used by the STEM to filter data that is used to generate alerts. For example, assets that are outside of a threshold distance from a high-value target within an AG can be filtered out, such that an event/alert is not triggered, or, if an event/alert is triggered, a priority of the alert can be provided based on the AG data. As another example, if an asset that is the subject of an alert is flagged as being in a critical path, a priority of the alert can be elevated.

With regard to the second scenario, the STEM platform can process (e.g., perform analytics over) data received from multiple data sources (e.g., firewall logs, anti-virus logs, network access logs), and can generate events. In some examples, for an event, a priority of the alert can be provided based on a traditional technique, such as CIA, described above. Accordingly, an event can be suspected as being critical based on the initially assigned priority (e.g., CIA score). In accordance with implementations of the present disclosure, the AG data can be used selectively enhance the criticality of the event and elevate the corresponding alert. In some examples, the SIEM platform can identify one or more assets that underly an alert. For example, if an alert is based on a log-in attack associated with a particular computing device within the network at least one AG that include the computing device can be referenced. It can be determined whether the asset is on a critical path within an AG. If the asset is on a critical path, a priority of the alert is increased.

Figure 4:
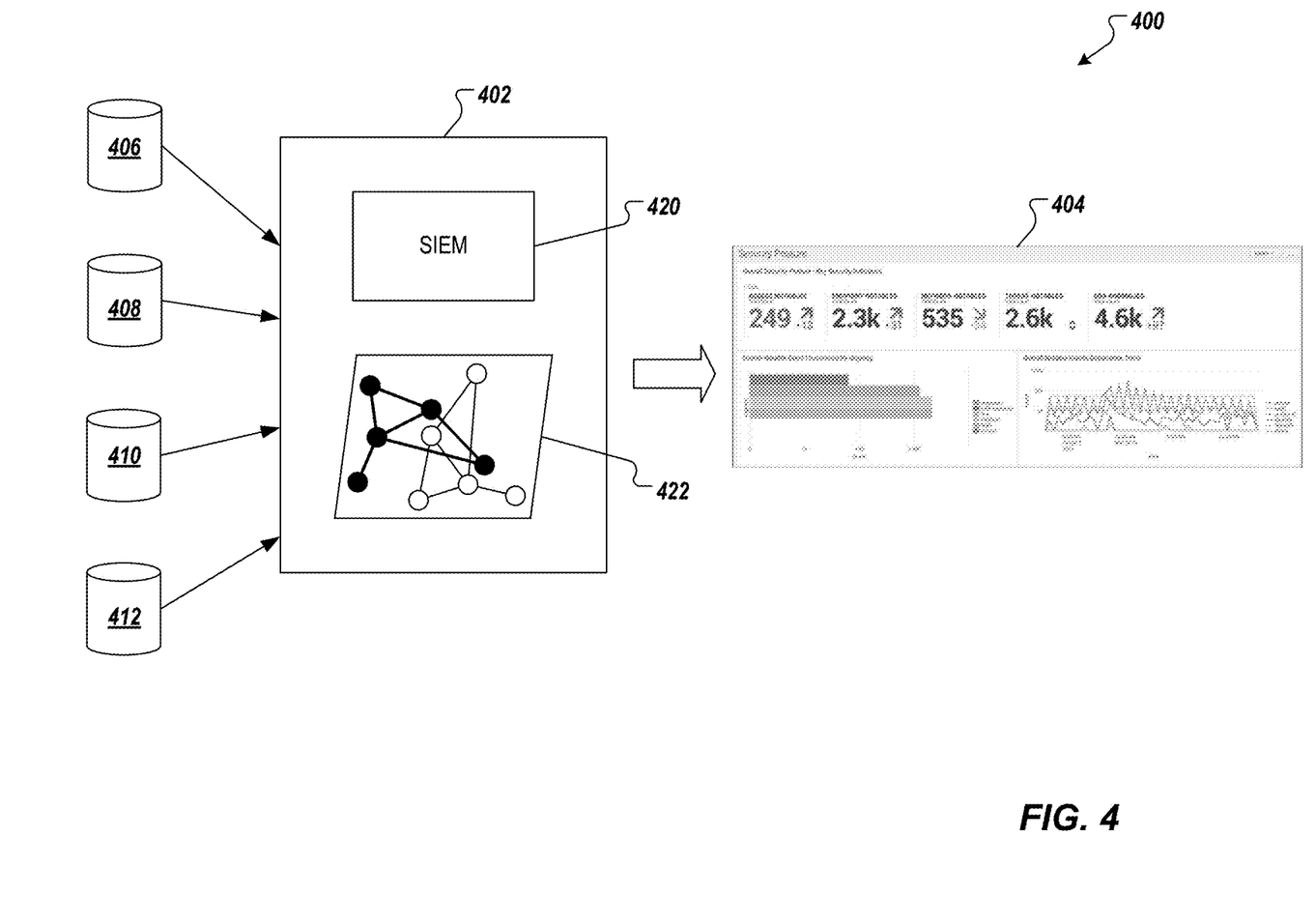
FIG. 4 depicts an example conceptual architecture in accordance with implementations of the present disclosure.

FIG. 4 depicts an example conceptual architecture 400 for leveraging AGs in accordance with implementations of the present disclosure. The example conceptual architecture 400 includes a prioritization platform 402 and a SOC interface 404 for displaying alerts. As described in further detail herein, the prioritization platform 402 receives data from one or more data sources 406, 408, 410, 412. Example data sources can include, without limitation, a firewall log data 406, anti-virus log data 408, user authentication logs 410, and operating system logs 412.

In the depicted example, the prioritization platform 402 includes a SIEM platform 420 and AG data 422. In some examples, the SIEM platform 420 processes data provided from one or more of the data sources 406, 408, 410, 412 to selectively generate events and alerts. For example, the SIEM platform 420 can process the data provided from one or more of the data sources 406, 408, 410, 412 through one or more analytic programs, which can selectively generate an event and alert. For example, an event and alert can be generated, if the data indicates that a threshold number of failed login attempts within a threshold time period at a particular host (e.g., computing device). As another example, an event and alert can be generated, if the data indicates that a particular host has flagged known malware.

In some examples, the AG data 422 represents multiple AGs, each AG being associated with a high-value target as identified within the AgiSec platform of the present disclosure. In some implementations, the AG data 422 can be used in multiple scenarios, such as the first scenario and the second scenario described herein. For example, in the first scenario, the AG data 422 can be used to filter the amount of data that is processed for generating events and alerts, such that events and alerts that are generated and visualized in the SOC interface 404 have a higher likelihood of representing an actual attack that is of significance. In this manner, a reduced number of alerts are generated, the alerts being of higher quality (e.g., reduced false positives). As another example, in the second scenario, an asset that underlies an event can be cross-referenced with the AG data 422 to determine whether the asset is included along a critical path of an AG. If the asset is along a critical path, the priority of the alert is enhanced (e.g., bumped from important to critical).

Figure 5:
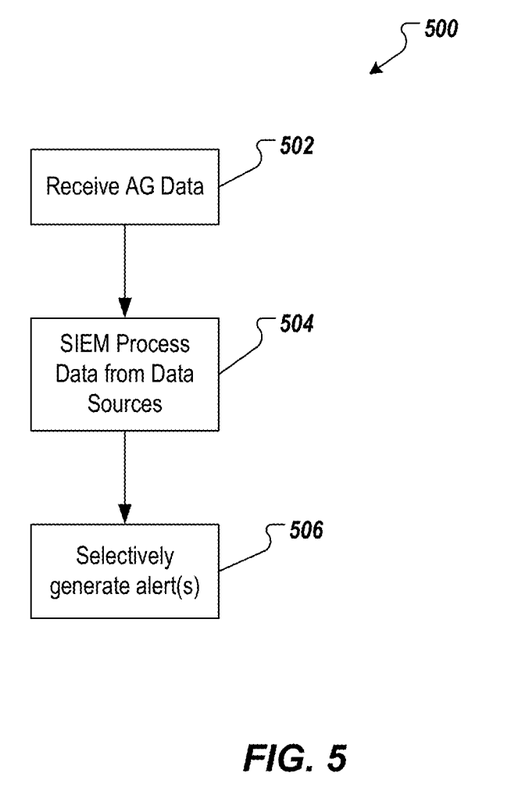
FIG. 5 depicts an example process that can be executed in accordance with implementations of the present disclosure.

FIG. 5 depicts an example process 500 that can be executed in accordance with implementations of the present disclosure. In some implementations, the example process 500 may be performed using one or more computer-executable programs executed using one or more computing devices. The example process 500 can be performed for security of enterprise networks.

AG data is received (502). In some examples, the AG data is received from an agile security platform. The AG data is representative of one or more AGs, each AG representing one or more lateral paths within an enterprise network for reaching a target asset from one or more assets within the enterprise network. In some implementations, each AG is generated by a discovery service of the agile security platform, the discovery service detecting assets using one or more adaptors and respective asset discovery tools that generate an asset inventory and a network map of the enterprise network. In some implementations, each AG is associated with a target within the enterprise network, the target being selected based on a disruption occurring in response to an attack on the target. In some examples, the disruption is based on one or more metrics. In some examples, the one or more metrics include loss of technical resources, physical losses, disruption in services, and financial losses.

Data is processed (504). For example, a security platform processes data from one or more data sources to selectively generate at least one event. In some examples, the at least one event represents a potential security risk within the enterprise network. An alert is selectively generated (506). For example, an alert is generated within the security platform. The alert represents the at least one event. In accordance with implementations of the present disclosure, the alert is associated with a priority within a set of alerts, the priority being is based on the AG data. In some implementations, the alert is associated with an asset and is assigned an initial priority, and the priority includes an elevated priority relative to the initial priority based on the AG data. In some implementations, the initial priority is elevated to the priority in response to determining that the asset is included in a critical path represented within the AG data. In some implementations, the event is selectively generated based on filtering a plurality of potential events based on the AG data.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for security of enterprise networks, the method being executed by one or more processors and comprising:
    receiving, from an agile security platform, attack graph (AG) data representative of one or more AGs comprising nodes and edges between nodes, each edge being associated with an activity in an enterprise network, wherein the nodes and edges define one or more lateral paths within the enterprise network for reaching a target asset from one or more assets within the enterprise network;
    processing, by a security platform, data from one or more data sources to selectively generate at least one event, the at least one event representing a potential security risk within the enterprise network; and
    selectively generating, within the security platform, an alert representing the at least one event, the alert being associated with a priority within a set of alerts, the priority being based on at least one of a number of incoming edges or a number of outgoing edges of at least one node in the AG data.

2. The method of claim 1, wherein the alert is associated with an asset and is assigned an initial priority, and the priority comprises an elevated priority relative to the initial priority based on the at least one of the number of incoming edges or the number of outgoing edges of at least one node in the AG data.

3. The method of claim 2, wherein the initial priority is elevated to the priority in response to determining that the asset is included in a critical path represented within the AG data.

4. The method of claim 1, wherein the event is selectively generated based on filtering a plurality of potential events based on the AG data.

5. The method of claim 1, wherein each AG is generated by a discovery service of the agile security platform, the discovery service detecting assets using one or more adaptors and respective asset discovery tools that generate an asset inventory and a network map of the enterprise network.

6. The method of claim 1, wherein each AG is associated with a target within the enterprise network, the target being selected based on a disruption occurring in response to an attack on the target.

7. The method of claim 6, wherein the disruption is based on one or more metrics.

8. The method of claim 7, wherein the one or more metrics comprise loss of technical resources, physical losses, disruption in services, and financial losses.

9. A non-transitory computer-readable storage medium coupled to one or more processors and having instructions stored thereon which, when executed by the one or more processors, cause the one or more processors to perform operations for security of enterprise networks, the operations comprising:
    receiving, from an agile security platform, attack graph (AG) data representative of one or more AGs comprising nodes and edges between nodes, each edge being associated with an activity in an enterprise network, wherein the nodes and edges define one or more lateral paths within the enterprise network for reaching a target asset from one or more assets within the enterprise network;
    processing, by a security platform, data from one or more data sources to selectively generate at least one event, the at least one event representing a potential security risk within the enterprise network; and
    selectively generating, within the security platform, an alert representing the at least one event, the alert being associated with a priority within a set of alerts, the priority being based on at least one of a number of incoming edges or a number of outgoing edges of at least one node in the AG data.

10. The computer-readable storage medium of claim 9, wherein the alert is associated with an asset and is assigned an initial priority, and the priority comprises an elevated priority relative to the initial priority based on the at least one of the number of incoming edges or the number of outgoing edges of at least one node in the AG data.

11. The computer-readable storage medium of claim 10, wherein the initial priority is elevated to the priority in response to determining that the asset is included in a critical path represented within the AG data.

12. The computer-readable storage medium of claim 9, wherein the event is selectively generated based on filtering a plurality of potential events based on the AG data.

13. The computer-readable storage medium of claim 9, wherein each AG is generated by a discovery service of the agile security platform, the discovery service detecting assets using one or more adaptors and respective asset discovery tools that generate an asset inventory and a network map of the enterprise network.

14. The computer-readable storage medium of claim 9, wherein each AG is associated with a target within the enterprise network, the target being selected based on a disruption occurring in response to an attack on the target.

15. The computer-readable storage medium of claim 14, wherein the disruption is based on one or more metrics.

16. The computer-readable storage medium of claim 15, wherein the one or more metrics comprise loss of technical resources, physical losses, disruption in services, and financial losses.

17. A system, comprising:
one or more computers; and
a computer-readable storage device coupled to the computing device and having instructions stored thereon which, when executed by the computing device, cause the computing device to perform operations for security of enterprise networks, the operations comprising:
receiving, from an agile security platform, attack graph (AG) data representative of one or more AGs comprising nodes and edges between nodes, each edge being associated with an activity in an enterprise network, wherein the nodes and edges define one or more lateral paths within the enterprise network for reaching a target asset from one or more assets within the enterprise network;
processing, by a security platform, data from one or more data sources to selectively generate at least one event, the at least one event representing a potential security risk within the enterprise network; and
selectively generating, within the security platform, an alert representing the at least one event, the alert being associated with a priority within a set of alerts, the priority being based on at least one of a number of incoming edges or a number of outgoing edges of at least one node in the AG data.

18. The system of claim 17, wherein the alert is associated with an asset and is assigned an initial priority, and the priority comprises an elevated priority relative to the initial priority based on the at least one of the number of incoming edges or the number of outgoing edges of at least one node in the AG data.

19. The system of claim 18, wherein the initial priority is elevated to the priority in response to determining that the asset is included in a critical path represented within the AG data.

20. The system of claim 17, wherein the event is selectively generated based on filtering a plurality of potential events based on the AG data.

21. The system of claim 17, wherein each AG is generated by a discovery service of the agile security platform, the discovery service detecting assets using one or more adaptors and respective asset discovery tools that generate an asset inventory and a network map of the enterprise network.

22. The system of claim 17, wherein each AG is associated with a target within the enterprise network, the target being selected based on a disruption occurring in response to an attack on the target.

23. The system of claim 22, wherein the disruption is based on one or more metrics.

24. The system of claim 23, wherein the one or more metrics comprise loss of technical resources, physical losses, disruption in services, and financial losses.

* * * * *